Dec. 1, 1953  W. J. DEVINE ET AL  2,661,003
VARICOSE VEIN STRIPPER WITH FLEXIBLE GUIDE LEADER
Filed Nov. 20, 1952
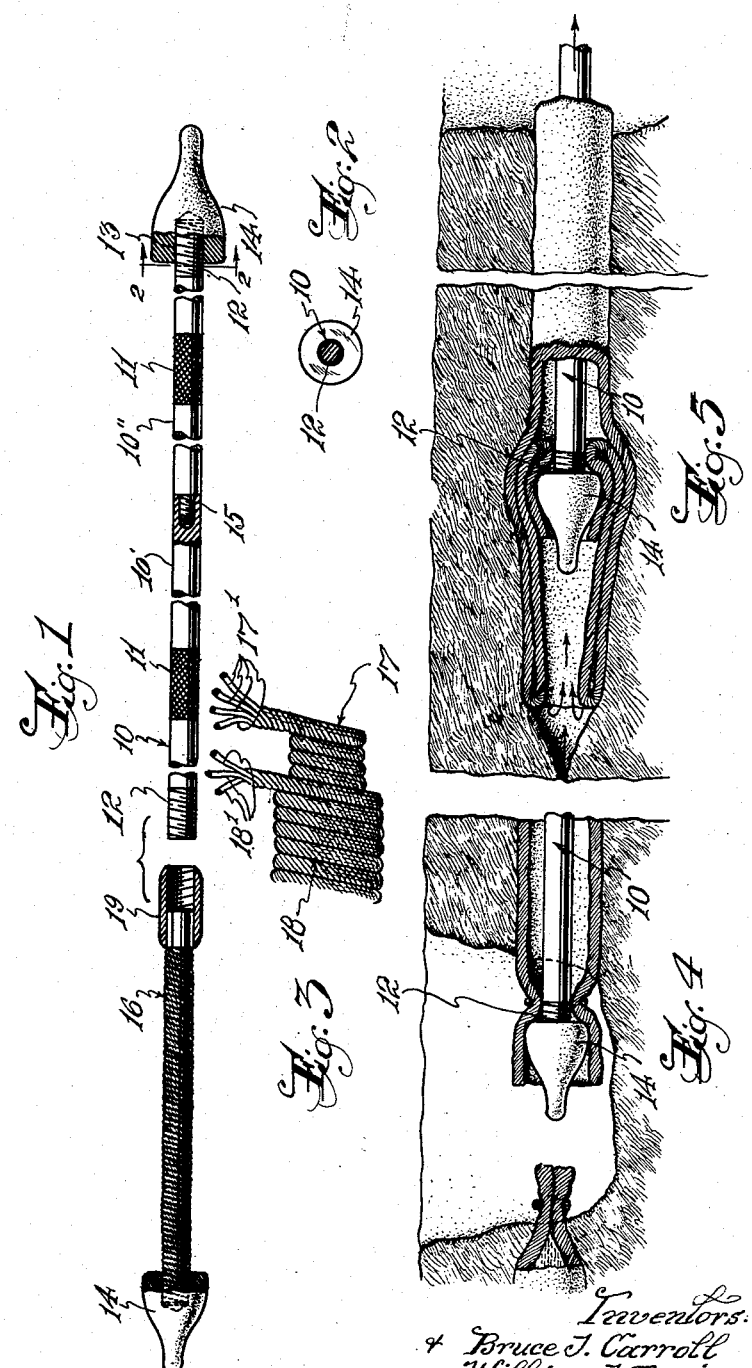
Inventors:
Bruce J. Carroll
William J. Devine.
BY Dudley B. Howard
Attorney.

Patented Dec. 1, 1953

2,661,003

UNITED STATES PATENT OFFICE 2,661,003

VARICOSE VEIN STRIPPER WITH FLEXIBLE GUIDE LEADER

William John Devine, North Plainfield, and Bruce J. Carroll, Plainfield, N. J.

Application November 20, 1952, Serial No. 321,632

13 Claims. (Cl. 128—303)

The invention relates in general to surgical instruments and has particular reference to the instrument used for the venous stripping operation performed in surgical treatment of varicose veins, which instrument is commonly called a "varicose vein stripper."

The varicose vein stripper used prior to our invention has consisted of an attenuated one-piece thrust-traction body of rod-form having conoidal protective tip members attached to both ends to permit vein penetration in either direction. The thrust-traction body is thus termed because of the dual mechanical functions that it performs. It must thrust lengthwise through the interior of an affected vein until the latter is completely penetrated and then exert traction on the vein in the act of stripping it from the patient's leg during withdrawal of the instrument in the opposite direction.

As the instrument advances in its initial penetration of the vein, frictional resistance to that penetration increases progressively due to the constantly enlarging area of contact with the vein wall and also to increasing lateral pressure exerted on the instrument by bends in the vein and by the inwardly bulging valves encountered along the way. For that reason, the thrust-traction body was made fairly stiff. Otherwise, it would be likely to buckle under the ever increasing resistance to thrust during vein penetration. At the same time, it was known that changes in direction of the vein made it advisable to afford some degree of flexibility. Consequently, a compromise was effected by making the thrust-traction body of resilient material, such as spring steel, so that there might be some lateral yielding under the influence of deviations in the course of the vein through the leg.

It has been found, however, that the thrust-traction body of the earlier instrument was not sufficiently yielding in numerous instances. Sometimes, when a branch vein was encountered at a particularly abrupt bend in the vein to be stripped, the tip member at the leading end of the instrument would fail to follow the turn and would enter the branch vein instead.

With this disadvantage of the old instrument structure in mind, it has been our primary purpose to provide an improved instrument which has a thrust-traction body that will safely negotiate all turns in the course of the vein that is being penetrated.

While conducting experiments in the fulfillment of our purpose, we discovered that, if a short guide leader of carefully calculated length and flexibility exceeding that of the thrust-traction body be affixed to the entering end of the thrust-traction body in prolongation thereof, this guide leader will follow all deviations in the course of the affected vein easily and surely without any tendency to enter branch veins. At the same time, the guide leader is of such short length that the total resistance to which it is ever subjected in its advance will not be enough to cause it to buckle and thereby obstruct movement of the thrust-traction body.

A further object of the invention is to provide a guide leader that is not only laterally flexible to a high degree but also is freely yieldable to torsion, such as may be imparted to its conoidal tip member by inwardly bulging vascular valves, whereby the tip member can roll slightly on its axis and thus "worm its way" past these obstructions.

The above and other objects, features and advantages of the present invention will be more fully understood from the following specific description when considered in connection with the accompanying drawing, in which:

Fig. 1 is an exploded view, showing the improved instrument with the guide leader in position for attachment to the thrust-traction body; Fig. 2 is a transverse section on line 2—2 of Fig. 1; Fig. 3 is a greatly enlarged side elevation of a fragment of the guide leader, showing the manner in which its structural elements are united; Fig. 4 is a roughly outlined fragmentary longitudinal cross-sectional view of a patient's leg, showing the instrument (minus the guide leader) after penetration of a ligated vein and with the inner severed end of the strippable portion tied to the thrust-traction body preparatory to the outward stripping movement; and Fig. 5 is a similar view at a later stage, wherein the inner end of the vein is being drawn outward through the interior of the still immobile remainder thereof.

Referring now in detail to the drawing, wherein like reference characters designate corresponding parts in the several views, Figs. 1 and 2 represent the improved varicose vein stripper in partially disassembled condition. The instrument includes a thrust-traction body 10 in the form of a rod of resilient material, such as stainless steel, which preferably is substantially one-eighth of an inch in outside diameter and substantially thirty-six inches long. The peripheral surface of thrust-traction body 10 may be provided, as shown, with longitudinally spaced knurled areas 11 to enable the surgeon to grasp the said body securely at successive locations close to the exit incision during either insertion or withdrawal in a manner to be described more fully later herein. The opposite ends of thrust-traction body 10 as a whole are exteriorly screw-threaded as at 12 for alternative detachable engagement with the screw-threaded socket 13 in the base of a protective tip member 14, which preferably has the conoidal shape shown and is adapted to serve as a handle for the instrument.

By dividing thrust-traction body 10 into at least two separable sections 10' and 10" which are connected by a screw-threaded flush joint 15, said body may be disassembled into sections of a length that makes it possible to place them in an instrument sterilizer of standard size (not shown). Furthermore, these sections may be packed side-by-side in a short case or box when not in use.

The principal improvement, however, is the provision of a flexible guide leader 16 to be attached temporarily to the end of thrust-traction body 10 that is to enter the vein to be removed by the stripping operation. This guide leader 16 to be most effective should be substantially one-eighth as long as thrust-traction body 10, or four and one-half inches, and preferably is in the form of a twisted cable substantially equal in diameter to the said body.

The guide leader construction which has been found to be completely satisfactory and easy to manufacture is illustrated in detail in Fig. 3. It will be observed that guide leader 16 comprises a core 17 and an outer covering 18. Core 17 is constructed by twisting together a number of strands 17' of spring steel wire. Only four loose wire ends are visible in Fig. 4, but it has been found that seven strands of .004 inch wire, when closely wound, produce a core of most suitable diameter. Covering 18 preferably is constructed by twisting together three strands 18' of .005 inch spring steel wire and winding the fine cable thus formed around core 17 in the same direction of twist as that followed by strands 17' of the latter. As a result of this specific construction, when guide leader 16 is subjected to torsional stresses, the respective convolutions of which it is composed will unwind and, after the stresses are relieved, will return to normal tight condition due to their inherent resiliency.

A conoidal tip member 14 identical in form with the one to be used as a handle at one end of thrust-traction body 10 is sweated with silver solder onto one end of guide leader 16. Due to this permanent attachment of the tip member, which is the most practical way to do it, it becomes necessary to supply a set of about three guide leaders with tip members of respectively different diameters for use with each thrust-traction body in order to be able to fit veins of different inside diameters which may be encountered in practice.

At the opposite end of each guide leader 16, an internally screw-threaded bushing 19 is similarly sweated on with silver solver to serve as means by which the guide leader may be removably attached to the entering end of the thrust-traction body 10 of the instrument i. e. the end opposite to that which is provided with a large tip member 14 as a handle.

The operational use of the improved instrument will now be described.

The instrument is prepared for the venous stripping operation by attaching a guide leader 16 having a tip member 14 of appropriate size to the entering end of thrust-traction body 10. Then, after the groin incision has been made and the internal, or long, saphenous vein of the affected leg, with all its tributaries, has been ligated and severed, an incision is made in the inner aspect of the angle to expose and sever the vein at this point. Following this preparation, the thrust-traction body 10 of the instrument is grasped at one of the knurled areas near the entering end of the instrument and the tip member 14 of guide leader 16 is inserted into the vein and forced steadily and carefully therethrough. As it advances, the surgeon successively changes his grip on thrust-traction body 10 from one knurled area 11 to the next one. When the tip member 14 on guide leader 16 has completely penetrated the vein, guide leader 16 is unscrewed and a separate tip member 14 of appropriate size is substituted. Then, tip member 14 is drawn into the inner end of the vein into the position shown in Fig. 4 and the vein is tied securely to thrust-traction body 10 adjacent to said tip member, as shown. In this position of the instrument, the large tip member at the other end of thrust-traction body 10 will be close to the ankle incision in a convenient location to be used as a handle for initial use in starting withdrawal of the instrument. Such a handle is preferred to one of the knurled areas 11 at this juncture when maximum resistance to starting movement of the instrument is likely to be caused by the initial infolding of the vein end. After the stage of withdrawal of the instrument shown in Fig. 5 is reached, the resistance should be sufficiently lessened to permit use of knurled areas 11 in further movement. As will be observed, the vein is stripped from the leg in "wrong-side-out" condition.

Following removal of the internal, or long, saphenous vein, the external, or short, saphenous vein is removed in similar manner.

It will be understood that it is intended to cover all changes and modifications of the example of the invention herein chosen for the purpose of illustration which do not constitute departures from the spirit and scope of the invention.

Having thus described the invention, we claim:

1. A varicose vein stripper comprising: an attenuated thrust-traction body constructed of resilient material and being of such diameter that it is slightly flexible laterally and yet sufficiently stiff for vein penetration without buckling under the influence of frictional resistance; and a guide leader arranged in prolongation of the entering end of said thrust-traction body, said guide leader being sufficiently more flexible than the thrust-traction body to yieldingly follow deviations in the course of the vein and being of such length that the total frictional resistance to thrust normally encountered will not cause said guide leader to buckle during penetration.

2. A varicose vein stripper as defined in claim 1, wherein the thrust-traction body is substantially eight times as long as the guide leader.

3. A varicose vein stripper as defined in claim 1, wherein the guide leader is of composition and construction which renders it yieldable to bending and torsional stresses.

4. A varicose vein stripper as defined in claim 3, wherein a conoidal tip member is affixed to the free entering end of the guide leader.

5. A varicose vein stripper as defined in claim 1, wherein the guide leader consists of twisted strands of flexible material.

6. A varicose vein stripper as defined in claim 5, wherein the twisted strands of flexible material are also resilient.

7. A varicose vein stripper as defined in claim 1, wherein the guide leader consists of a core composed of twisted strands of flexible material, and a covering composed of twisted strands of flexible material wound around said core.

8. A varicose vein stripper as defined in claim 7, wherein the covering for the core is wound around the latter in the same direction of twist as the strands that compose said core.

9. A varicose vein stripper as defined in claim 7, wherein the flexible strands of which the core and covering are made are also resilient.

10. A varicose vein stripper as defined in claim 1, wherein means is provided to detachably secure the trailing end of the guide leader to the entering end of the thrust-traction body.

11. A varicose vein stripper as defined in claim 1, wherein screw-threaded means detachably secures the trailing end of the guide leader to the entering end of the thrust-traction body.

12. A varicose vein stripper as defined in claim 1, wherein the thrust-traction body is divided into plural sections and means is provided to detachably secure said sections together in axial alignment.

13. A varicose vein stripper as defined in claim 1, wherein the guide leader consists of a core composed of twisted strands of flexible resilient material, and a covering composed of twisted strands of flexible resilient material wound around the core in the same direction of twist as the strands that compose said core.

WILLIAM JOHN DEVINE.
BRUCE J. CARROLL.

References Cited in the file of this patent

UNITED STATES PATENTS

| Number | Name | Date |
|---|---|---|
| 2,221,138 | Hendrickson | Nov. 12, 1940 |
| 2,437,542 | Krippendorf | Mar. 9, 1948 |

OTHER REFERENCES

"Surgery," November 1952 (published November 1, 1952), vol. 32, No. 5, pages 846–851. A copy of this publication is available in the Scientific Library of the Patent Office.